United States Patent [19]

Lee et al.

[11] Patent Number: 5,106,639
[45] Date of Patent: Apr. 21, 1992

US005106639A

[54] FATTY FODDER ADDITIVES FOR USE IN PRODUCING MEAT WITH A HIGH CONTENT OF OMEGA-3-FATTY ACIDS AND LOW CONTENT OF CHOLESTEROL, AND PROCESS FOR PREPARING SAME

[75] Inventors: Nam-Hyung Lee; Chil-Surk Yoon; Heung-man Kim; Byung-Sung Park; Ken-Hong Yoo; Ki-Seung Seong, all of Seoul; Duck-Young Kim, Kyeongsangbuk, all of Rep. of Korea

[73] Assignee: Korea Food Research Institute, Kyonggi, Rep. of Korea

[21] Appl. No.: 649,019

[22] Filed: Feb. 1, 1991

[30] Foreign Application Priority Data

Feb. 10, 1990 [KR] Rep. of Korea .................. 1620/1990

[51] Int. Cl.⁵ ................................................ A23K 1/00
[52] U.S. Cl. ....................... 426/302; 426/72; 426/74; 426/98; 426/602; 426/609; 426/807
[58] Field of Search ..................... 426/2, 98, 302, 602, 426/609, 807, 303, 310

[56] References Cited

U.S. PATENT DOCUMENTS

| | | | |
|---|---|---|---|
| 2,913,342 | 11/1959 | Cameron et al. | 426/98 |
| 3,892,880 | 7/1975 | Grolitsch | 426/555 |
| 3,973,046 | 8/1976 | Mol | 426/98 |
| 4,007,284 | 2/1977 | Goryaev et al. | 426/98 |
| 4,021,582 | 5/1977 | Hsu | 426/307 |
| 4,217,370 | 8/1980 | Rawlings et al. | 426/98 |
| 4,404,228 | 9/1983 | Cloosterman et al. | 426/98 |
| 4,540,586 | 9/1985 | Moore | 426/302 |
| 4,804,549 | 2/1989 | Howley et al. | 426/98 |
| 4,906,479 | 3/1990 | Kitagawa et al. | 426/2 |
| 4,913,921 | 4/1990 | Schroeder | 426/602 |
| 4,960,795 | 10/1990 | Salte et al. | 426/2 |
| 4,983,403 | 1/1991 | Ardaillon et al. | 426/302 |

Primary Examiner—R. B. Penland
Attorney, Agent, or Firm—Browning, Bushman, Anderson & Brookhart

[57] ABSTRACT

A process for preparing fatty fodder additives comprising mixing an emulsifier, a carrier and a fat material containing omega-3-fatty acids and selected from the class consisting of vegetable oil, animal fats, fatty acids and mixtures thereof to produce an emulsion, atomizing and drying the emulsion to produce a powdered fat and coating the resulting powdered fat with an enteric coating material thereby producing an enteric coated fatty fodder additive.

14 Claims, No Drawings

FATTY FODDER ADDITIVES FOR USE IN PRODUCING MEAT WITH A HIGH CONTENT OF OMEGA-3-FATTY ACIDS AND LOW CONTENT OF CHOLESTEROL, AND PROCESS FOR PREPARING SAME

BACKGROUND OF THE INVENTION

1. Field of the Invention

The present invention relates to fodder additives for domestic animals, and to a process for preparing such fatty fodder additives making it possible to increase the content of omega-3-fatty acids and decrease the content of cholesterol in meats from domestic animals fed with such fodder additives.

2. Description of the Background

Methods for producing dehydrated soap powders to solve the problems of handling liquid fats used in such soap powders and methods for producing powdered fats in order to reduce their autoxidation are known as shown in U.S. Pat. Nos. 3,892,880, 3,973,046, 4,021,582 and 4,007,284 and PCT/SE 87/00419.

Among the conventional methods employed in obtaining fatty acid powders is a cold spray dray method comprising the steps of mixing the fat with an emulsifier and protein carrier, solidifying the resulting mixture in an air blast chamber at $-30°\sim 5°$ C. and adding a powdered diluent, such as starch, in order to avoid clumping. Alternatively, an emulsion containing fat, emulsifier, water, skim milk and the like can be spray dried in air at $120°\sim 170°$ C.

A fatty acid powder may also be obtained by hydrolyzing a fat with strong acid or alkali, adding a metal salt thereto to precipitate the salt of fatty acid, removing the remaining acid or alkali with water and then drying it. Although the products prepared by the above mentioned methods are easy to handle, the product made from the fatty acid salt suffers an increased rate of fat oxidation as the chemical state changes from triglyceride to ester to free fatty acid, and lastly to the metal salt of the fatty acid. Consequently $80\sim 90\%$ of fatty acid within the free fatty acid salt ends up as a saturated fatty acid. Further, since most spraydried products have a high content of saturated fatty acids, they have disadvantages when used for aminal fodder to produce meat with the high content of omega-3-fatty acids and the low content of cholesterol. There is also a problem of autoxidation after prolonged storage. Furthermore, because the liberation of metal components, Ca or Na from the fatty acid by acidity of stomach proceeds slowly and due to the higher melting points of these salts, animals cannot normally absorb the fatty acids in the small intestine.

SUMMARY OF THE INVENTION

The present invention provides a process for producing fatty fodder additives comprising preparing an emulsion from a fat material containing omega-3-fatty acids such as a vegetable oil, an animal fat or fatty acid itself, drying the emulsion in a drier to produce powdered fat and coating the powdered fat with an enteric coating material. Thus obtained fatty fodder additives can be used for increasing the omega-3-fatty acids, e.g. linolenic acid, eicosapentaenoic acid and docosahexaenoic acid, and lowering the cholesterol in meat obtained from domestic animals fed with the fatty fodder. The fatty fodder produced according to this method helps to maintain the absorption rate constant.

The present invention also provides an improved fatty fodder additive comprising a particulate dried mixture obtained from a composition comprising a fat material containing omega-3-fatty acids such as vegetable oil, animal fats, fatty acids or glycerides thereof, an emulsifier and a solid carrier, and an enteric coating deposited on said particulate dried mixture.

DETAILED DESCRIPTION OF THE PREFERRED EMBODIMENT

The present inventors have made extensive studies in order to solve the above described problems in the prior art and provide fatty fodder additives for domestic animals which, when fed to the animals, leads to the production of meats with a higher content of omega-3-fatty acids and a lower content of cholesterol.

Of conventional meat products, pork has the particular disadvantage of having a fatty acid composition in which the contents of saturated fatty acids and cholesterol are high. The present inventors have developed fatty fodder additives for producing meats, such as pork, which are rich in omega-3-fatty acids while poor in cholesterol.

Non-limiting examples of fat materials having omega-3-fatty acids include vegetable oils such as soybean oil, perilla oil, lineseed oil, crude soybean lecithin or red pepper seed oil or mixtures thereof. Non-limiting examples of animal material suitable for use as fats having omega-fatty acids include fish oil, and other oils and fats derived from animal sources. Also pure omega-3-fatty acids can be used. It is understood that the term fatty acids includes the glycerides thereof.

Suitable emulsifiers include monoglycerides, diglycerides and mixtures thereof which are generally added to the fat material in an amount of from about 1 to about 10 percent by weight of the fat material.

As noted above, in the process of the present invention, an emulsion of the fat material is formed, the emulsion containing, in addition to the fat material and the emulsifier, materials such as water, whey, fish solubles, corn syrup or mixtures thereof.

In preparing the emulsion, the fat material is generally heated to a temperature of about $20°\sim 50°$ C., the emulsifier, water, whey or other materials being present such to form an emulsion. Once the emulsion is formed, it is mixed with a suitable particulate carrier such as soybean protein, skim milk solids, starch, pectin, gelatine, collagen, casein, egg protein and the like. The water, whey, fish solubles and the like can be employed as a solvent for the carrier material, i.e. the carrier material in such a suitable solvent can be added to the emulsion obtained as above.

In carrying out the process of the present invention, the emulsion of the fat material and the carrier material are mixed and homogenized in a suitable homogenizer to produce and emulsion of all of the ingredients. This emulsion is then suitably dried, as for example in a spray drier using blown air at a temperature of from about 120° to about 180° C. It is also possible to dry the emulsion using a fluidized bed drier. In this case, the carrier material is fluidized with the emulsified fat material to produce a mixture of carrier material and emulsified fat which is then atomized and dried.

The particulate of powdered fat product obtained as above will generally have a particle size ranging from about 0.1 to about 1.0 mm with a fat content of about 5% or greater.

Additives such as magnesium stearate, silicon oxide(-SiO₂), vitamins, minerals, antibiotics and celluloses, each in a suitable amount, can be added to the powdered fat.

Cellulosive materials such as ethyl cellulose, cellulose acetate phthalate, hydroxypropyl methyl cellulose, hydroxypropyl cellulose, methyl cellulose, or shellac can be used as an enteric coating material by dissolving the cellulosive material in a solvent to a final concentration of from about 1 to about 10% by weight.

To obtain the final product, i.e., the fatty fodder additives, the powdered fat is coated with the enteric coating material in a coater to obtain a final fatty fodder additive having a particle size of from about 0.5 to about 2.0 mm. Normally this can be done by spraying a solution of the enteric coating into a fluidized bed of the dried fatty fodder additive, the solvent from the enteric coating solution being removed in the drier leaving the enteric material on the fatty fodder additive.

The process for preparing powdered fat according to this invention will be described in more detail by way of the following non-limiting example.

EXAMPLE

Step 1

Atomization of fat (a) Preparation of 30% powdered fat

To a mixture of 50 g of fish oil and 50 g of soybean oil was added 5 g of Tween 60 (General purpose emulsifier marketed by Atlas Chemical Industries, Inc. and composed of polyoxyethylene derivatives of fatty and partial esters of sorbitol anhydrides.) as an emulsifier, and the resulting mixture was heated to 50° C. 300 g of whey was added and the mixture homogenized to obtain an emulsion. Into a fluidized bed drier was charged a carrier comprising a mixture of 100 g of soybean protein and 100 g of corn starch. The emulsion was dried by spraying it from the top of the drier while fluidizing the carrier by upflowing air heated to 50° C. to obtain powdered fat.

The fat mixture of carrier, fish oil and soybean oil contained 5.4% of linolenic acid, 6.1% of eicosapentaenoic acid and 2.6% of docosahexaenoic acid.

(b) Preparation of 50% powdered fat 400 g of perilla oil, 10 g of Tween 60 (as an emulsifier) and 200 g of whey (solid content 30%) were well mixed and homogenized. 1100 g of whey (solid content 30%) was then incorporated to give a complete emulsion. This emulsion was heated to 50° C. and dried in a spray drier to give a powdered fat. The perilla oil contains 60% linolenic acid.

(c) Preparation of 70% powdered fat 225 g of fish oil, 225 g of crude soybean lecithin, 10 g of Tween 60 and 10 g of Span 60 (General purpose emulsifier marketed by Atlas Chemical Industries, Inc. and comprised of fatty acid partial esters of sorbitan.) were mixed, 200 g of water was added thereto and the resulting mixture (A) was homogenized while increasing the temperature of 50° C. to give an emulsion.

Separately, 1300 g of water, 55 g of soybean protein, 50 g of corn starch, 30 g of dextrinized starch, 15 g of pectin, 15 g of gelatin and 15 g of calcium carbonate CaCO₃) were well mixed to give a mixture (B).

The above mixtures A and B were combined and homogenized, and the homogenate was dried in a fluidized bed drier while maintaining the temperature of upflowing air to 145° C. to give a powdered fat.

The fat mixture of fish oil and crude soybean lecithin contains 12.5% of phospholipid, 5.5% of linolenic acid, 7.5% of eicosapentaenoic acid and 2.8% of decosahexaenoic acid.

Step 2

Coating of powdered fat obtained in step 1 with enteric coating material and drying (a) 200 g of the 30% powdered fat obtained in step 1 was charged into a fluidized bed coater, and a solution obtained by dissolving 5 g ethyl cellulose in 100 ml of methyl alcohol was sprayed into the coater to coat the fluidized powdered fat with ethyl cellulose film, thereby obtaining the desired product.

(b) 100 g of the 50% powdered fat obtaining in step 1 was charged into a fluidized bed coater and a solution obtained by dissolving a mixture of 2.1 g hydroxypropylmethyl cellulose and 0.9% of sodium carboxymethyl cellulose in 100 ml of water was sprayed into the coater to coat the fluidized powdered fat with a film of hydroxypropyl methyl cellulose and sodium carboxymethyl cellulose, thereby obtaining the desired product.

(c) After charging 200 g of the 70% powdered fat obtained in step 1 into a fluidized bed coater, a mixture of 10 g of magnesium stearate, 10 g of Avicell (A microcrystalline cellulose marketed by FMC Corporation.) and 10 g of silicon oxide was added thereto. The fluidized mixture was coated with a solution of celluloseacetate phthalate (7.5 g) in 100 ml of acetone to give the desired product.

The fatty fodder additives prepared according to this invention have the following advantages:

1. Meats in which the content of unsaturated fatty acids, particularly omega-3-fatty acid is high but that of chloesterol is low can be produced when the present additives are fed to domestic animals.

2. It exhibits only a moderate hardness for domestic animals to eat.

3. It can be used to formulate feeds, or added directly to existing animal feeds at the time of feeding.

4. Its storage and transfer are easy.

5. It makes it possible to store fats for a long time without employing an antioxidant such as BHT or BHC.

6. The unit cost of production may be lowered when by-products such as whey or fish solubles are used in place of water so as to reduce the amount of carrier materials.

7. When the powdered fat obtained in step 1 is incorporated into compounds such as vitamins, probiotics, drugs or antibiotics as dry mixtures, it is possible to retard the oxidation of such compounds and increase their absorption into intestines.

In order to show the excellent effect of the fatty fodder additives according to this invention, pigs were fed an experimental diet to which the additive was added in an amount of 5% in terms of fat, and the changes in amount of omega-3-fatty acids accumulated in microsome of liver, loin and subcutaneous fat were observed. The results are shown in Tables 1, 2 and 3, respectively.

TABLE 1

Changes in Amount of Omega-3-Fatty Acids Accumulated in Microsome of Liver

| content | Fatty Acids in Microsome (%) | | | | |
|---|---|---|---|---|---|
| Fatty Acid | a | b | c | d | e |
| Linolenic acid | 0.37 | 0.29 | 8.27 | 11.30 | 0.91 |
| Eicosapentaenoic acid | 0.65 | 0.29 | 7.74 | 10.72 | 7.25 |
| Docosapentaenoic acid | 1.70 | 1.21 | 2.54 | 4.20 | 2.61 |
| Docosahexaenoic acid | 3.70 | 2.20 | 2.00 | 3.50 | 9.29 |
| Total W-3 fatty acids | 6.42 | 3.99 | 20.55 | 29.72 | 20.26 |

TABLE 2

Changes in Amount of Omega-3-Fatty Acids Accumulated in Loin

| content | Fatty Acids in Loin (%) | | | | |
|---|---|---|---|---|---|
| Fatty Acid | a | b | c | d | e |
| Linolenic acid | 0.48 | 0.44 | 4.57 | 7.45 | 2.47 |
| Eicosapentaenoic acid | 0.53 | 0.15 | 1.05 | 2.72 | 2.25 |
| Docosapentaenoic acid | 0.56 | 0.24 | 1.00 | 2.24 | 3.26 |
| Docosahexaenoic acid | 0.85 | 0.25 | 0.85 | 1.75 | 8.08 |
| Total W-3 fatty acids | 2.42 | 1.08 | 7.47 | 14.16 | 16.06 |

TABLE 3

Changes in Amount of Omega-3-Fatty Acids Accumulated in Subcutaneous Fat

| content | Fatty Acids in Subcutaneous Fat (%) | | | | |
|---|---|---|---|---|---|
| Fatty Acid | a | b | c | d | e |
| Linolenic acid | 0.50 | 0.55 | 9.43 | 15.50 | 1.00 |
| Eicosapentaenoic acid | — | — | 0.14 | 0.50 | 0.73 |

(Note) In the above Tables 1, 2 and 3, "a" indicates a diet to which tallow is added, "b" indicates a diet to which cottonseed oil is added, "c" indicates a diet to which powdered perilla oil is added, "d" indicates a diet to which is added the present additive obtained by coating powdered perilla oil with a mixture of hydroxypropylmethyl cellulose-sodium carboxymethyl cellulose (70:30) and "e" indicates a diet to which is added the present additive obtained by coating a powdered fat mixture of crude soybean lecithin-fish oil (50:50) with cellulose acetate phthalate.

As shown in Tables 1, 2 and 3, the additives according to this invention increase the content of omega-3-fatty acids, particularly eicosapentaenoic acid and docosahexaenoic acid in meats from pigs fed the additive. Since the additives coated with enteric coating polymers lower the initial rapid peak of fatty acids absorption, the fatty acids were absorbed slowly for 4~10 hours. Thereby the omega-3-fatty acid level in the blood is maintained constantly and desaturation and elongation reactions of linolenic acid in microsomes of liver is sustained to the highest degree.

What is claimed is:

1. A process for preparing a dry particulate fatty fodder additive for use in producing meat with a high content of omega-3-fatty acids and a low content of cholesterol, comprising:

admixing at a temperature between about 20° C. and about 50° C., a fatty material containing an omega-3-fatty acid having 2% by weight or more of eicosapentaenoic acid and about 2% by weight or more docosahexaenoic acid, said fatty material selected from the group consisting of vegetable oils, fish oils, animal fats and oils, omega-3-fatty acids, and glycerides of said vegetable oils, said fish oils, said animal fats and oils and said omega-3-fatty acids and mixtures of said oils, fats and glycerides, an emulsifier suitable for emulsifying said fatty material, said emulsifier comprising from about 1 to about 10 percent-by-weight of said fatty material and a dietary acceptable particulate carrier, said fatty material, emulsifier and carrier being present in an amount effective to form a liquid emulsion;

atomizing and drying said emulsion to produce a powdered fat comprising at least about 5 percent-by-weight fat; and coating said powdered fat with a cellulosic enteric coating material.

2. The process according to claim 1, wherein said fat material has a fatty acid composition further comprising 2% or more by weight of linolenic acid, 2% or more by weight of eicosapentaenoic acid and about 2% or more by weight of docosahexaenoic acid.

3. The process according to claim 1, wherein said fat material further comprises crude soybean lecithin, 5% or more by weight of total phospholipid and about 2% or more by weight of linolenic acid.

4. The process according to claim 1, wherein the fat material is crude soybean lecithin and contains about 10% or more of total phospholipid and about 5% or more by weight linolenic acid.

5. The process of claim 1 wherein said particulate carrier is selected from the group consisting of soybean protein, skim milk solids, starch, pectin, gelatin, collagen, casein, egg protein and mixtures thereof.

6. The process of claim 5 further including a solvent for said carrier, said solvent selected from the group consisting of water, whey, fish solubles, corn syrup and mixtures thereof.

7. The process of claim 1 wherein said atomizing and drying occur at a temperature between about 120° C. and about 180° C.

8. The process of claim 7 wherein said atomizing and drying occur in a spray dryer.

9. The process of claim 7 wherein said atomizing and drying occur in a fluidized bed.

10. The process of claim 1 wherein said enteric coating material is selected from the group consisting of ethyl cellulose, methyl cellulose, hydroxypropyl cellulose, hydroxypropyl methyl cellulose, cellulose acetate phthalate, shellac and mixtures thereof.

11. The process of claim 1 wherein said enteric coating material comprises from about 1 to about 10 percent-by-weight in a solvent which is sprayed onto said powdered fat.

12. The process of claim 1 wherein said powdered fat is characterized by a particle diameter between about 0.1 mm and about 1.0 mm and wherein said fatty fodder additive is characterized by a particle diameter of about 0.5 mm to about 2.0 mm.

13. The process of claim 11 wherein said emulsifier is selected from the group consisting of the monoglycerides, the diglycerides and mixtures thereof.

14. The process of claim 1 further including admixing into said emulsion at least one feed additive selected from the group consisting of magnesium stearate, silica oxide, vitamins, minerals, antibiotics, cellulose and mixtures thereof.

* * * * *